Sept. 17, 1963   L. J. HIERTA ET AL   3,103,867
DAMPER DOOR CONTROL

Filed Sept. 12, 1961   2 Sheets-Sheet 1

LARS J. HIERTA
JAMES W. MURRAY
*INVENTOR.*

BY John R. Faulkner
John J. Roethel
ATTORNEYS

3,103,867
DAMPER DOOR CONTROL
Lars J. Hierta, Garden City, and James W. Murray, Dearborn, Mich., assignors to Ford Motor Company, Dearborn, Mich., a corporation of Delaware
Filed Sept. 12, 1961, Ser. No. 137,563
4 Claims. (Cl. 98—2)

This invention relates to ventilators and more particularly to a damper door control mechanism for an automotive ventilating system.

In an automotive ventilating system outside air flows through one of a plurality of possible paths prior to discharge into the interior of the vehicle. For example, the outside air may be directly discharged into the vehicle or it may first be passed over cooling or heating coils for temperature modification before introduction into the vehicle. The path of air flow through the ventilating system is controlled by a plurality of damper doors placed in various ducts. Proper positioning of the several damper doors results in the desired quantity and temperature air flow.

The selection by the vehicle occupant of the proper positions of the damper doors may be greatly simplified if all of the doors are manipulated by a single multi-position control. The various positions of the control correspond to the desired damper door settings.

To achieve the desired flow, an individual door may be required to remain in either an open or closed position for more than one position of the control. This necessitates some form of lost motion in the drive linkage for the particular door so that its position will not be changed during a portion of the movement of the control.

It is an object of this invention to provide a simplified damper door control mechanism that permits a predetermined degree of travel of the actuating member without affecting the position of the damper door.

It is a further object of this invention to provide a cam mechanism for actuating the damper door. The cam mechanism permits the door to be moved at differing rates during movement of the actuating member.

In the instant invention, the damper door is movably supported on the ventilator assembly to vary the rate and direction of air flow through the ventilator duct. A first cam member is secured to the damper door and cooperates with a second cam member that is actuated by the ventilator control. The cam members cooperate to provide a stage of operation in which the damper door is prevented from movement as the actuating member moves. A further stage of operation is provided during which movement of the actuating member is accompanied by movement of the door.

Further objects and advantages of this invention will become more apparent as the description proceeds particularly when considered in conjunction with the accompanying drawings, wherein.

Figure 1:
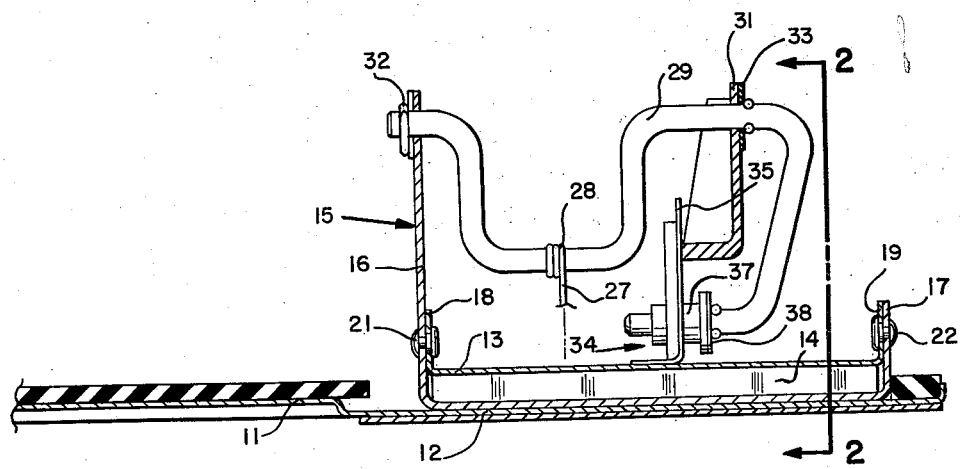
FIGURE 1 is a cross sectional view taken along line 1—1 of FIGURE 2 showing a portion of a ventilator assembly incorporating the instant invention.
Figure 2:
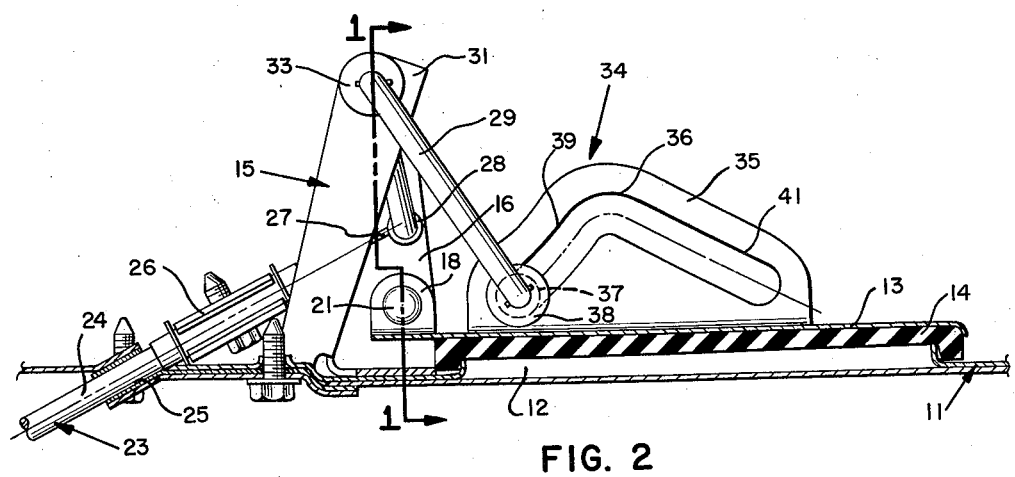
FIGURE 2 is a cross sectional view taken along line 2—2 of FIGURE 1 illustrating the damper in a closed position.

Referring now in detail to the drawings, there is shown at 11 a sheet metal portion of the body of an automotive ventilator assembly. An air duct opening 12 is formed in ventilator sheet metal 11. The flow of air through duct opening 12 is controlled by a damper door 13 movably supported on the ventilator assembly. A resilient gasket 14 is bonded or otherwise secured to the damper door 13 to provide an air tight seal with the ventilator sheet metal 11 when the damper door 13 is in the closed position (FIGURE 2).

Figure 3:
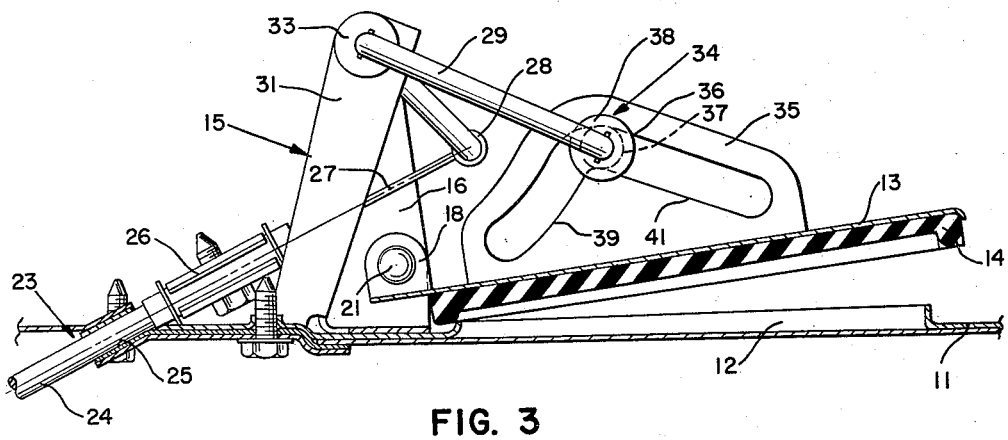
FIGURE 3 is a cross sectional view in part similar to FIGURE 2 showing the damper in an intermediate position.
Figure 4:
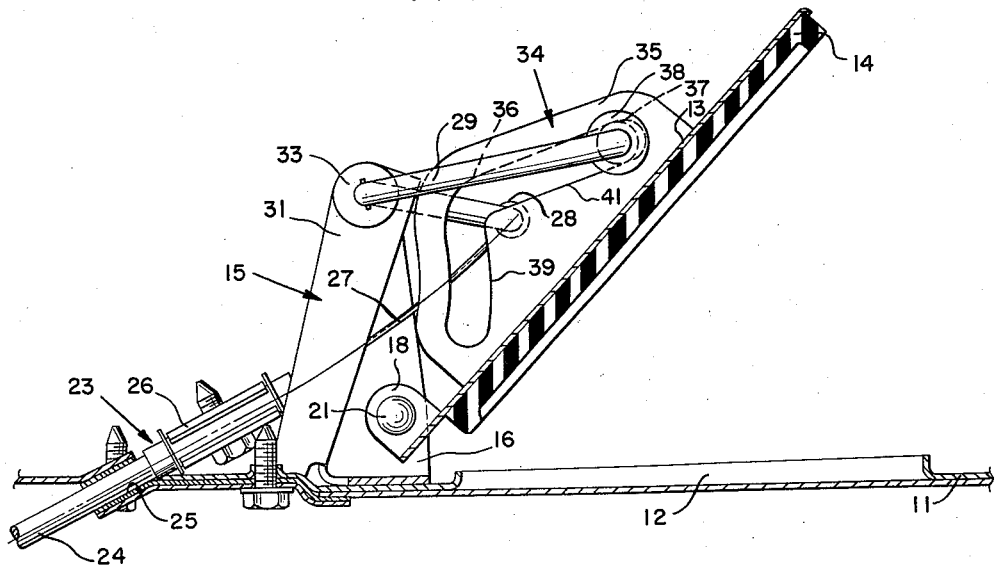
FIGURE 4 is a cross sectional view in part similar to FIGURES 2 and 3 showing the damper in a fully open position.

The damper door 13 is supported by a sheet metal bracket structure, indicated generally at 15. The bracket 15 is spot welded or otherwise secured to the ventilator sheet metal 11. The bracket 15 has upstanding leg portions 16 and 17. Flanges 18 and 19 formed on the damper door 13 are pivotally supported by rivets 21 and 22 which are, in turn, secured to the legs 16 and 17 of the bracket 15. The damper door 13 may thereby swing from the closed position (FIGURE 2) to the partially open position (FIGURE 3) or the fully open position (FIGURE 4).

A Bowden wire assembly 23 is provided for actuation of the damper door 13. The protective sheath 24 of the Bowden wire assembly 23 passes through an aperture 25 formed in the ventilator sheet metal 11 and is secured against movement relative thereto by a clamp 26. The wire actuator 27 of the Bowden wire assembly 23 is connected at one end to the ventilator control mechanism for actuation (not shown). The other end of the wire actuator 27 is formed in a pigtail 28 which encircles a bell crank operating member 29.

The bell crank 29 is rotatably supported within apertures formed in the leg 16 and a further leg 31 of the bracket 15. Clips 32 and 33 prevent axial movement of the bell crank 29 relative to the bracket 15.

Movement is translated from the wire actuator 27 and the bell crank 29 into movement of the damper door 13 by the cam mechanism indicated generally at 34. The cam mechanism 34 includes a plate 35 which is spot welded or otherwise secured to the damper door 13. The plate 35 has the cam track 36 formed therein. A cam member 37 is carried on an inturned projection of the bell crank 29 and is received in the cam track 36. A clip 38 prevents disengagement of the cam member 37 from the cam track 36.

It may seem that the cam track 36 consists of first and second portions 39 and 41. The portion 39 is arcuate in shape and corresponds to a part of the path of movement of the cam member 37 as the bell crank 29 pivots about its support. This configuration causes a dwell in the operation of the damper door 13 as the bell crank 29 pivots. The dwell ceases when the cam member 37 reaches the end of cam track portion 39 and enters the portion 41 (FIGURE 3). Upon entering the portion 41, the cam member 37 causes the damper door 13 to commence to open. Continued movement of the bell crank 29 causes the damper door 13 to continue to open until the fully opened position is reached (FIGURE 4). The rate of opening of the damper door may be controlled by appropriately varying the shape of the cam track portion 41.

In the illustrated embodiment, the dwell portion in the operation of the damper door 13 occurs prior to opening of the door. It is to be understood that the configuration of the cam track 36 may be chosen in a manner to permit opening of the door immediately upon pivotal movement of the bell crank 29. The dwell portion would, in that case, occur after the door was fully opened. Other changes and modifications may be made without departing from the spirit and scope of the invention as defined by the appended claims.

We claim:
1. In a ventilator assembly having an air outlet, a damper door pivotally supported on said assembly for controlling the flow of air through said outlet, a cam track secured to said damper door, cam means pivotally supported on said assembly cooperating with said cam track, and actuating means controlling the position of said cam means, said cam track having an arcuate portion coinciding with a portion of the path of movement of said cam means whereby movement of said damper door is precluded during movement of said cam means, said cam track having a further portion cooperating with said cam means to move said damper door upon movement of said cam means.

2. In a ventilator assembly having an air outlet, a damper door movably supported on said assembly for controlling the flow of air through said outlet, first cam means secured to said damper door, second cam means cooperating with said first cam means for controlling the position of said damper door, and a flexible transmitter having one end thereof secured to said second cam means for positioning said second cam means, said cooperating cam means being constructed and arranged to provide a stage of operation in which movement of said damper door is precluded during movement of said second cam means and another stage of operation in which movement of said second cam means causes movement of said first cam means and said damper door.

3. In a ventilator assembly having an air outlet, a damper door pivotally supported on said assembly for controlling the flow of air through said outlet, a cam track secured to said damper door, cam means pivotally supported on said assembly cooperating with said cam track, and a flexible transmitter having one end thereof affixed to said cam means for controlling the position of said cam means, said cam track having an arcuate portion coinciding with a portion of the path of movement of said cam means whereby movement of said damper door is precluded during movement of said cam means, said cam track having a further portion cooperating with said cam means to move said damper door upon movement of said cam means.

4. In a ventilator assembly having an air outlet, a damper door pivotally supported on said assembly for controlling the flow of air through said outlet, a cam track secured to said damper door, a bell crank having an intermediate portion journaled at its sides on said assembly, said bell crank further having an end portion extending into said cam track, cam means interposed between said end portion and said cam track for transmitting motion between said bell crank and said damper door, and a flexible transmitter having one end thereof affixed to the intermediate portion of said bell crank for actuating the latter, said cam track having an arcuate portion coinciding with a portion of the path of movement of said cam means whereby movement of said damper door is precluded during a portion of the movement of said cam means, said cam track having a further portion cooperating with said cam means to move said damper door upon another portion of the movement of said cam means.

References Cited in the file of this patent
UNITED STATES PATENTS

| | | |
|---|---|---|
| 2,020,370 | Moog et al. | Nov. 12, 1935 |
| 2,707,079 | Little et al. | Apr. 26, 1955 |

FOREIGN PATENTS

| | | |
|---|---|---|
| 1,221,428 | France | June 1, 1960 |